Patented Oct. 24, 1933

1,931,643

UNITED STATES PATENT OFFICE 1,931,643

CAULKING COMPOUND AND METHOD OF APPLICATION

Warren G. Brown, Detroit, Mich.

No Drawing. Application August 27, 1930
Serial No. 478,318

3 Claims. (Cl. 72—106)

In the fabrication of masonry constructions it is quite customary for difficulties to be encountered because of the formation of openings in the cement at the masonry joints through which water and air may leak. Very much difficulty has been experienced in attempts which have been made to caulk these joints and any efforts of this character which have been successful have entailed a very considerable expense.

It is one of the primary objects of my invention to provide a material and method of caulking which will be inexpensive and will efficiently close any openings in the joints.

One of the greatest objections to caulking with conventional Portland cement mixtures is that the composition will in time fall out of the openings into which it is placed. Another difficulty has been that of forcing the caulking material into the openings which are to be closed.

It is one of the objects of my invention to provide a matrial which may be brushed or otherwise applied to the masonry joints so as to completely fill any openings which may be found therein and to make such material of constituents which will swell after being applied and will not therefore become dislodged.

In the practical application of my invention I have obtained very satisfactory results by making a mixture of approximately 80% Portland cement, 12% pulverized iron and 8% of lime or other coloring material (all by volume) to which is added enough water to make the composition plastic. I then take a stiff brush and apply the composition along the masonry joints without taking any particular pains to avoid having the material contact with the faces of the bricks or other masonry material. After the caulking material has taken an initial set, which I have found to be about one hour, the entire surface of the building or other structure may be washed with water to remove the surplus material on the faces of the joints and on the surrounding portions thereof. The caulking material, however, will have found its way into any openings in the masonry joints and that portion thereof will remain in place.

The pulverized iron which is in the composition will oxidize and swell so as not to loosen and fall out of the openings.

While I have herein described a particular composition which I have found to be useful and have also described a particular method of applying the same, I desire it to be understood that such description is relative to only one embodiment of my invention and that various changes may be made in the formula and composition of the caulking material and in the method of applying the same without departing from the spirit of my invention.

What I claim is:

1. A method of filling porous masonry surfaces to prevent the penetration of water which comprises applying thereto a film of a material containing as its essential ingredients cement and finely pulverized oxidizable metal which swells in oxidization, and subsequently removing substantially all of the material except that which is embedded in the surface by the applying step.

2. A method of filling porous masonry surfaces to prevent the penetration of water which comprises applying thereto by a brushing action a film of a material containing as its essential ingredients Portland cement and iron filing, permitting the material to set for a short period of time and then removing substantially all of the surplus material, leaving only the material which is embedded in the surface by the brushing action.

3. The method of filling porous masonry surfaces to prevent the penetration of water which comprises applying to the surface a film of material including Portland cement and a substance which will cause swelling of the material subsequent to application, forcing a portion of the film into the pores of the surface, allowing the material to partially set, and then removing substantially all of the surplus material, leaving substantially only the material which is embedded in the surface by the forcing operation.

WARREN G. BROWN.